US011118572B2

(12) United States Patent
Yamada et al.

(10) Patent No.: US 11,118,572 B2
(45) Date of Patent: Sep. 14, 2021

(54) METHOD OF REMODELING WIND TURBINE POWER GENERATION FACILITY

(71) Applicant: MITSUBISHI HEAVY INDUSTRIES, LTD., Tokyo (JP)

(72) Inventors: Tomokazu Yamada, Tokyo (JP); Hideya Egoshi, Tokyo (JP); Yasunori Kawaguchi, Tokyo (JP); Tatsuya Sakaue, Tokyo (JP); Seiji Okumura, Tokyo (JP); Jun Kanno, Tokyo (JP); Keiichiro Kawano, Tokyo (JP); Kazufumi Takayanagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 220 days.

(21) Appl. No.: 16/228,822

(22) Filed: Dec. 21, 2018

(65) Prior Publication Data

US 2019/0301434 A1 Oct. 3, 2019

(30) Foreign Application Priority Data

Mar. 29, 2018 (JP) .............................. JP2018-064101

(51) Int. Cl.
*F03D 80/50* (2016.01)
*F03D 80/80* (2016.01)
(Continued)

(52) U.S. Cl.
CPC ............. *F03D 80/50* (2016.05); *F03D 13/40* (2016.05); *F03D 80/88* (2016.05); *F03D 15/00* (2016.05);
(Continued)

(58) Field of Classification Search
CPC .......... F03D 80/50; F03D 80/88; F03D 13/40; F05B 2230/61; F05B 2230/80; F05B 2260/02
See application file for complete search history.

(56) References Cited

U.S. PATENT DOCUMENTS

2010/0005656 A1* 1/2010 Vangsy .................. F03D 13/10
29/889.1
2011/0211955 A1* 9/2011 Eriksen ................. B66C 23/207
416/9
(Continued)

FOREIGN PATENT DOCUMENTS

| JP | 2014503730 A | 2/2014 |
| WO | 2008071828 A1 | 6/2008 |
| WO | 2011099134 A1 | 8/2011 |

OTHER PUBLICATIONS

Office Action for Japanese Application No. 2018-064101 dated Jun. 25, 2019; 4pp.

*Primary Examiner* — Christopher M Koehler
(74) *Attorney, Agent, or Firm* — Manabu Kanesaka; Kenneth Berner; Benjamin Hauptman

(57) ABSTRACT

A reinforcement object is reinforced without being carried out from a wind turbine power generation facility. A method of remodeling a wind turbine power generation facility includes: a carry-in step of carrying a reinforcement member into a hub through an opening portion which has a smaller dimension than a reinforcement object inside the wind turbine power generation facility and which brings into communication inside of the hub and outside of a front side of the wind turbine power generation facility, the reinforcement member having a smaller dimension than the opening portion; and a reinforcement step of processing the rein- (Continued)

forcement object inside the hub, and reinforcing the reinforcement object by using the reinforcement member carried into the hub.

13 Claims, 9 Drawing Sheets

(51) Int. Cl.
　　　*F03D 13/40*　　　　(2016.01)
　　　*F03D 15/00*　　　　(2016.01)
(52) U.S. Cl.
　　　CPC ....... *F05B 2230/80* (2013.01); *F05B 2260/02* (2013.01)

(56) References Cited

U.S. PATENT DOCUMENTS

| | | | |
|---|---|---|---|
| 2012/0014775 A1* | 1/2012 | Numajiri | B66C 23/207 414/800 |
| 2012/0294684 A1* | 11/2012 | Mijangos | F03D 80/50 408/76 |
| 2013/0177419 A1 | 7/2013 | Zaehr | |
| 2014/0003943 A1 | 1/2014 | Valero Lafuente | |

* cited by examiner

FRONT ←——→ BACK

FIG. 9A
FIG. 9B
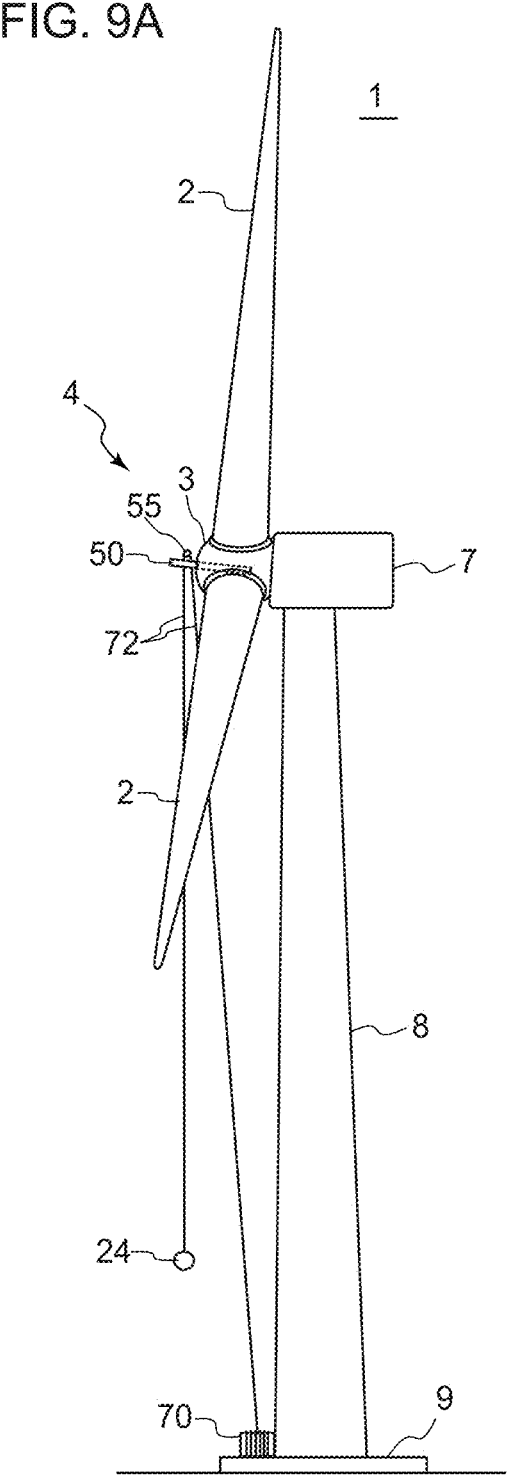
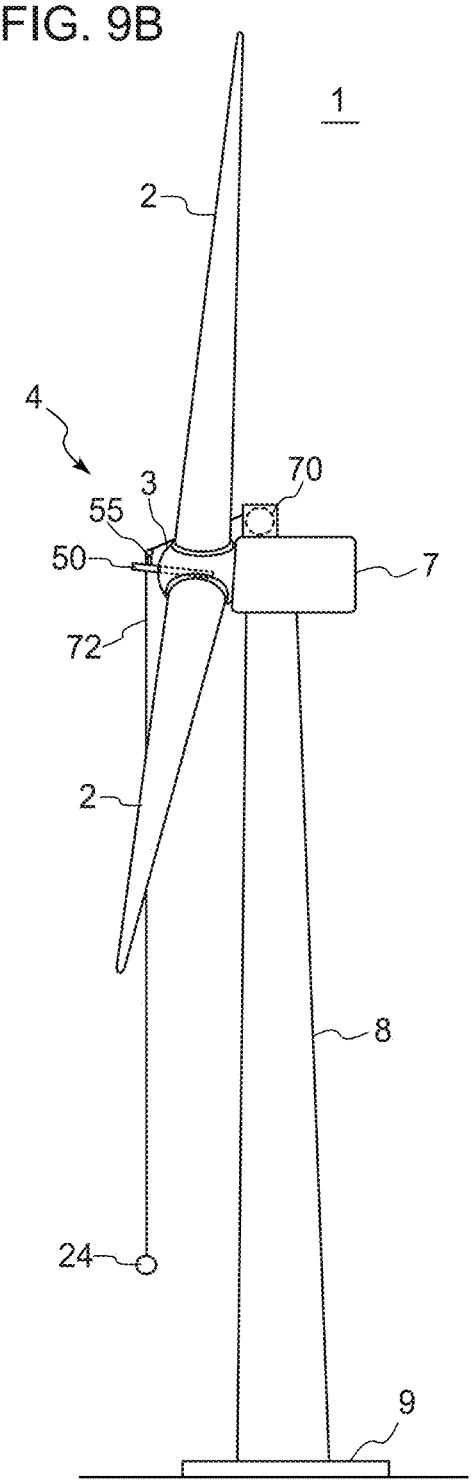

METHOD OF REMODELING WIND TURBINE POWER GENERATION FACILITY

RELATED APPLICATIONS

The present application claims priority from Japanese Application Number 2018-064101 filed Mar. 29, 2018, the disclosure of which is hereby incorporated by reference herein in its entirety.

TECHNICAL FIELD

The disclosure relates to a method of remodeling a wind turbine power generation facility.

BACKGROUND

Typically, lifting and lowering devices have been used for attaching and detaching a wind turbine blade to and from a hub in a wind turbine power generation facility.

For example, Patent Document 1 discloses a technique of lifting and lowering a hub or a wind turbine blade by using a crane fixed to a nacelle or a winch provided on the ground.

CITATION LIST

Patent Literature

Patent Document 1: WO 2008/071828A

SUMMARY

The wind turbine power generation facility goes through regular or random repairing, reinforcement, or remodeling (hereinafter, also referred to as repairing and the like). A wind turbine blade, a hub, or a nacelle also have to go through repairing and the like. Some parts installed in the hub or the nacelle can be taken out only when the hub or the nacelle is disassembled. Thus, replacement of such parts requires the hub or the like to be disassembled and thus may involve a large-scale operation requiring a large space, cost, or the like to install a large crane (weighing 100 t or more for example).

No specific configuration or method for the repairing and the like for parts installed in a hub or a nacelle is disclosed in Patent Document 1 described above.

An object of at least some embodiments of the disclosure is to enable a reinforcement object to be reinforced without being carried out from a wind turbine power generation facility.

(1) A method of remodeling a wind turbine power generation facility according to at least one embodiment of the disclosure includes:

a carry-in step of carrying a reinforcement member into a hub through an opening portion which has a smaller dimension than a reinforcement object inside the wind turbine power generation facility and which brings into communication inside of the hub and outside of a front side of the wind turbine power generation facility, the reinforcement member having a smaller dimension than the opening portion; and a reinforcement step of processing the reinforcement object inside the hub, and reinforcing the reinforcement object by using the reinforcement member carried into the hub.

With the method in (1) described above, the reinforcement operation for the reinforcement object can be completed with the processing operation performed inside the hub by using the reinforcement member having a smaller dimension than the opening portion, that is, than the reinforcement object and carried into the hub through the opening portion having a smaller dimension than the reinforcement object. Thus, the reinforcement or the remodeling for the wind turbine power generation facility does not require the reinforcement object, installed inside the wind turbine power generation facility and having a larger dimension than the opening portion of the hub, to be carried out from the wind turbine power generation facility. In other words, a simple method of performing the processing operation in the hub using the reinforcement member that can be carried in through the opening portion of the hub is employed, so that the large reinforcement object can be reinforced without being carried out from the wind turbine power generation facility. Furthermore, a work load, a cost, and a work period can be largely reduced.

(2) In some embodiments, the method according to (1) described above may further include an installment step of installing a rail and a pulley supported on the rail for lifting and lowering the reinforcement member, the rail extending at least from the opening portion to the inside of the hub, so that at least a part of the pulley is disposed outside the opening portion and at least a part of the rail is disposed inside the hub. The carry-in step may include carrying the reinforcement member into the hub by using the rail and the pulley.

With the method in (2) described above, the reinforcement member, having a smaller dimension than the opening portion, may be carried in and out through the opening portion, by being lifted and lowered by using the pulley at least a part of which is disposed outside the opening portion. Thus, a work load can be largely reduced compared with a configuration without the pulley, and the carry-in and carry-out operations can be easily, quickly, and safely performed.

(3) In some embodiments, in the method according to (2) described above, the hub may support a plurality of wind turbine blades and the installment step may include installing the rail between blade roots of the wind turbine blades inside the hub.

With the method in (3) described above, the rail is installed between the blade root portions inside the hub. Thus, when an azimuth angle of the wind turbine blade is set in such a manner that the rail is positioned on the lower side in the hub for carrying in the reinforcement member, no wind turbine blade is arranged below the rail or the pulley. Thus, the reinforcement member can be carried in by using the rail and the pulley with no interference between the wind turbine blade and the reinforcement member. Thus, improved operability can be achieved for the carry-in operation.

(4) In some embodiments, the method according to (3) described above may further include a removing step of removing at least a part of a power transmission part for causing pitch angles of the plurality of wind turbine blades to be changed in conjunction. The installment step may include installing a support member for fixing at least a part of the rail between the blade roots inside the hub, in place of the power transmission part removed in the removing step.

The support member that fixes the rail, supporting the pulley, inside the hub receives a tensile force as well as a compressive force. Thus, the support member is preferably firmly fixed inside the hub.

In view of this, with the method in (4) described above, the support member that fixes at least a part of the rail inside the hub is provided in the hub, instead of the existing power transmission part for causing the pitch angles of the wind turbine blades to be changed in conjunction. Thus, no fixed portion or the like for fixing the support member inside the hub needs to be additionally provided in the hub, and the existing structure that may contribute to the supporting of the rail inside the hub can be effectively used. Thus, a largest possible work space can be achieved inside the hub. Furthermore, a reinforcement or remodeling operation, requiring removing of the power transmission part, can be effectively performed with no waste in the work process.

(5) In some embodiments, in the method according to any one of (2) to (4) described above, the pulley may be supported on the rail via a supporting mechanism at least partially including a movable part which is movable along the rail. The installment step may include installing the pulley outside the opening portion by moving the movable part of the supporting mechanism along the rail and fixing the movable part.

With the method in (5) described above, the pulley can be installed outside the opening portion with a simple configuration using the supporting mechanism. Specifically, a configuration that enables the pulley to be installed outside the opening portion and to withstand the load of the reinforcement member can be achieved smoothly with at least a part of the supporting mechanism, in a state of being in a size small enough to pass through the opening portion, moved along the rail, and at least a part of the supporting mechanism fixed to the rail after the pulley is installed outside the opening portion.

(6) In some embodiments, in the method according to any one of (2) to (5) described above, the carry-in step may include lifting and lowering the reinforcement member by using a winch connected to a wire inserted through the pulley.

With the method in (6) described above, a driving force for lifting and lowering the reinforcement member that can pass through the opening portion of the hub can be obtained from the winch via the wire inserted through the pulley. Thus, a work load on an operator can be largely reduced in the lifting and lowering operation for carrying in and out the reinforcement member, used for reinforcing or remodeling the wind turbine power generation facility. Furthermore, since a large crane will not be required, a space and costs for installing the same will be saved significantly.

(7) In some embodiments, in the method according to (6) described above, the wind turbine power generation facility may include a nacelle rotatably supporting a rotor which includes the wind turbine blades and the hub, and a tower supporting the nacelle yaw-rotatably. The carry-in step may include lifting and lowering the reinforcement member by using the winch installed on a lower part of the tower or an upper part of the nacelle.

With the method in (7) described above, the winch can be installed at a position separated from the pulley that is at least partially installed outside the opening portion of the hub. With this arrangement, a large work space can be guaranteed around the opening portion. Furthermore, the winch can be installed at a location to be capable of withstanding the counterforce acting on the winch while the reinforcement member is being lifted or lowered.

(8) In some embodiments, in the method according to any one of (2) to (7) described above, the rail may include a plurality of rollers arranged in parallel to one another along a horizontal direction which is perpendicular to a longitudinal direction of the rail, and the carry-in step may include placing the reinforcement member on the rollers and carrying the reinforcement member through the opening portion.

With the method in (8) described above, the reinforcement member is placed on the plurality of rollers provided on the rail and is moved by using the plurality of rollers. Thus, the reinforcement member can easily move between the opening portion and an inner space of the hub.

(9) In some embodiments, in the method according to any one of (1) to (8) described above, the reinforcement object may include a plate connected to a blade root of each of a plurality of wind turbine blades inside the hub, the reinforcement member may include a reinforcement plate having an annular shape disposed between the plate and a coupling shaft for transmitting torque for changing a pitch angle to the plate, the reinforcement plate having a larger diameter than a flange portion of the coupling shaft fastened to the plate and a smaller diameter than the plate. The reinforcement step may include forming a bolt hole for attaching the reinforcement plate on the plate by using a template having a plurality of through holes which indicate bolt positions for attaching the reinforcement plate to the plate.

With the method in (9) described above, the template is used, so that the bolt hole, for attaching the reinforcement plate to the plate, can be easily formed in the plate. Furthermore, the bolt hole can be formed at an accurate position with respect to the plate, and a work time can be largely reduced.

(10) In some embodiments, in the method according to (9) described above, the template may include: a radially inner side through hole corresponding to an existing bolt hole for inserting a bolt to fasten the coupling shaft and the plate; and a radially outer side through hole for attaching the reinforcement plate to the plate.

With the method in (10) described above, the template is attached to the plate via the radially inner side through hole corresponding to the existing bolt hole for fastening the coupling shaft and the plate. In this state, the bolt hole can be formed in the plate through the radially outer side through hole. Thus, a new bolt hole can be formed at an accurate position after the existing bolt hole has been formed, or the operation for forming the bolt hole can be easily performed in a shorter period of time.

(11) In some embodiments, in the method according to (9) described above, the reinforcement step may include forming the bolt hole on the plate by using a magnetic drilling machine which is magnetically attachable to the plate inside the hub.

With the method in (11) described above, the magnetic drilling machine is used, so that the operation for forming the bolt hole can be easily performed. Furthermore, the magnetic drilling machine is magnetically attachable to the plate, and thus can be easily be positioned with respect to the plate. Thus, the reinforcement operation inside the hub can be completed within a much shorter period of time.

(12) In some embodiments, the method according to any one of (4) to (11) described above may further comprise a carry-out step of carrying the power transmission part broken down inside the hub out from the hub by using the rail and the pulley.

With the method in (12) described above, the power transmission part broken down inside the hub is carried out from the hub. Thus, a large work space inside the hub is guaranteed for performing the reinforcement operation for the reinforcement object inside the hub. Thus, a higher operability can be achieved.

(13) In some embodiments, in the method according to (12) described above, the carry-out step may include carrying out the power transmission part broken down into a weight of 500 kg or less.

With the method in (13) described above, the power transmission part may be broken down into a weight of 500 kg or less to be carried out through the opening portion of the hub. This means that most of the parts required to be carried in and out for reinforcing or remodeling the wind turbine power generation facility can be carried in and out through the opening portion. Thus, for example, in a case where a part is carried in and out through the opening portion using the pulley and the winch, even the power transmission part can be carried out without requiring a large crane. Thus, a space and a cost used for installing the crane are not required, whereby a large reduction in space and cost can be achieved.

(14) In some embodiments, in the method according to any one of (1) to (13) described above, the carry-in step or the reinforcement step may include using at least one chain block disposed inside the hub, in order to support the reinforcement member, change a direction of the reinforcement member, or move the reinforcement member.

With the method in (14) described above, the chain block disposed inside the hub is used to support the reinforcement member, change a direction of the reinforcement member, or move the reinforcement member inside the hub. Thus, the work load on the worker can be further reduced, and the work can be guaranteed to be performed more safely and quickly.

At least one embodiment of the disclosure enables a reinforcement object to be reinforced without being carried out from a wind turbine power generation facility.

BRIEF DESCRIPTION OF DRAWINGS

FIG. 9A and FIG. 9B are schematic views illustrating a method of remodeling a wind turbine power generation facility according to one embodiment.

DETAILED DESCRIPTION

Figure 1:
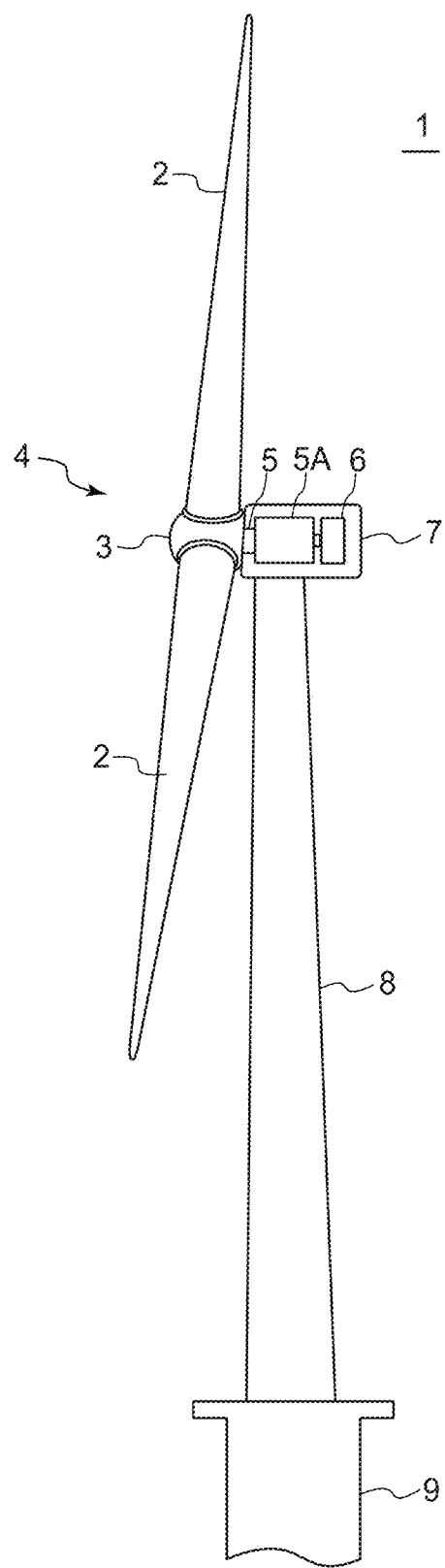
FIG. 1 is a schematic view illustrating a wind turbine power generation facility according to one embodiment.

Some embodiments of the disclosure are described with reference to the accompanying drawings. The size, material, shape, other relative arrangements, and the like described as embodiments or illustrated in the drawings are not intended to limit the scope of the disclosure to these, and are merely illustrative.

For example, expressions that represent relative or absolute arrangements such as "in a direction", "along a direction", "parallel", "perpendicular", "center", "concentric", or "coaxial" refer not only to what exactly these expressions represent but also to states that allow tolerance or are relatively displaced by such a degree of angle or distance that can achieve the same functions.

For example, expressions that means things are in an identical state such as "same", "identical", or "homogenous" refer not only to exactly identical states but also to states that allow tolerance or include such a difference that can achieve the same functions.

For example, expressions on shapes such as rectangular or cylindrical refer not only to shapes such as rectangular or cylindrical in a geometrically exact sense but also to such shapes that include protrusions, recesses, chamfered parts, or the like as long as the same functions are available.

Expressions that represent "comprising", "including", "being provided with", "with", or "having" one component are not exclusive expressions that would exclude the existence of other component(s).

Figure 2:
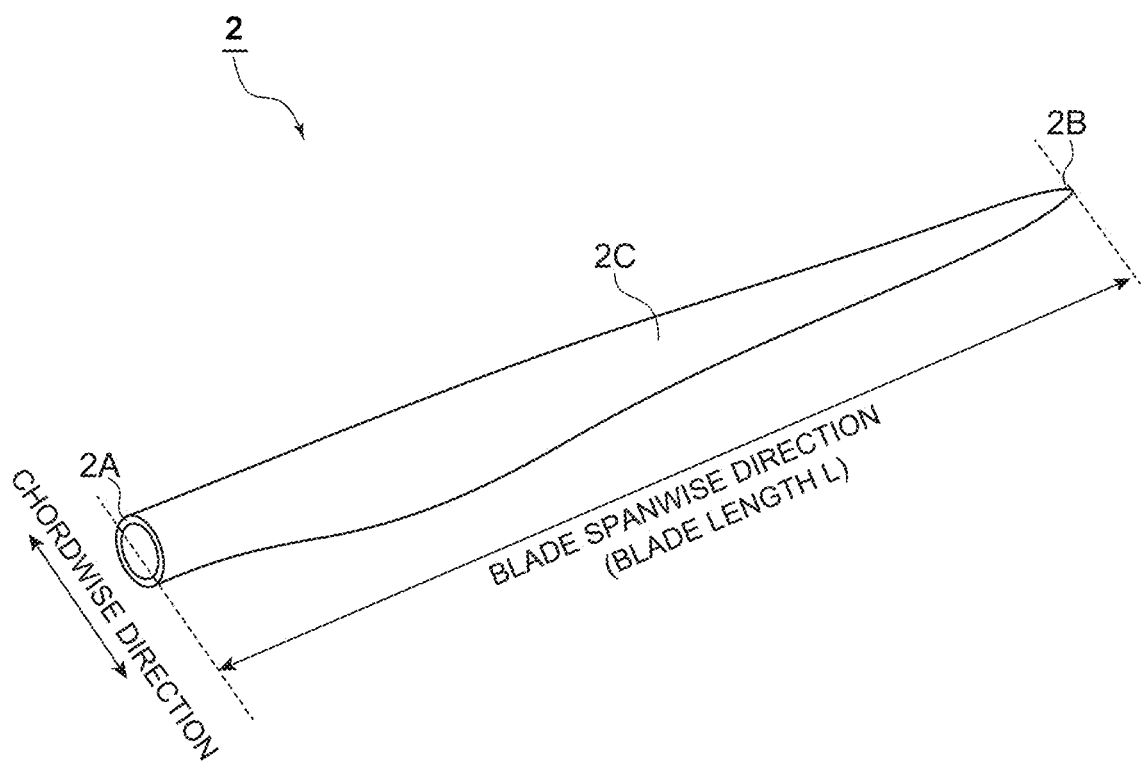
FIG. 2 is a perspective view illustrating an entire wind turbine blade according to one embodiment.
Figure 3:
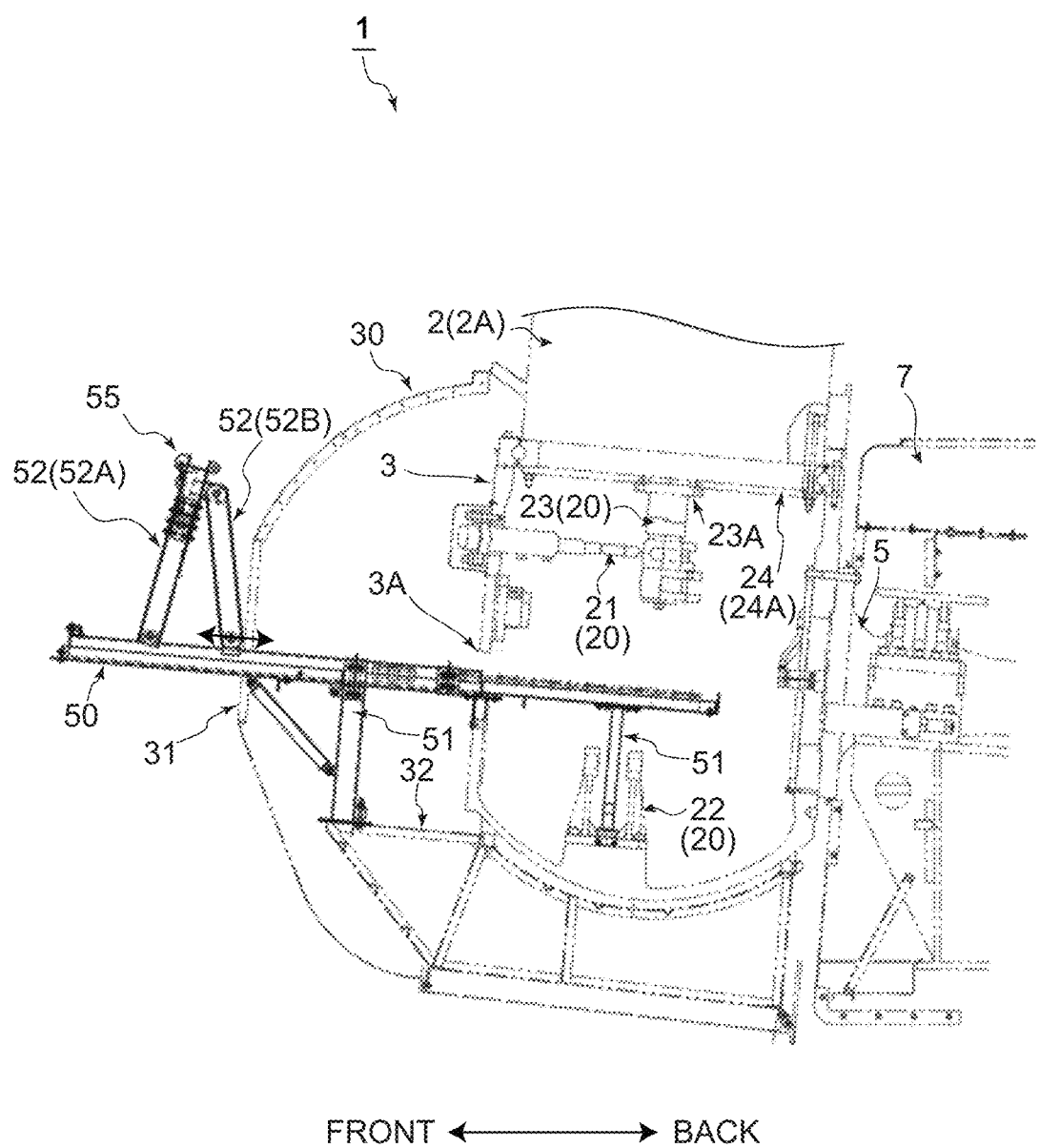
FIG. 3 is a schematic view illustrating the configuration of a hub and its periphery according to one embodiment.
Figure 4:
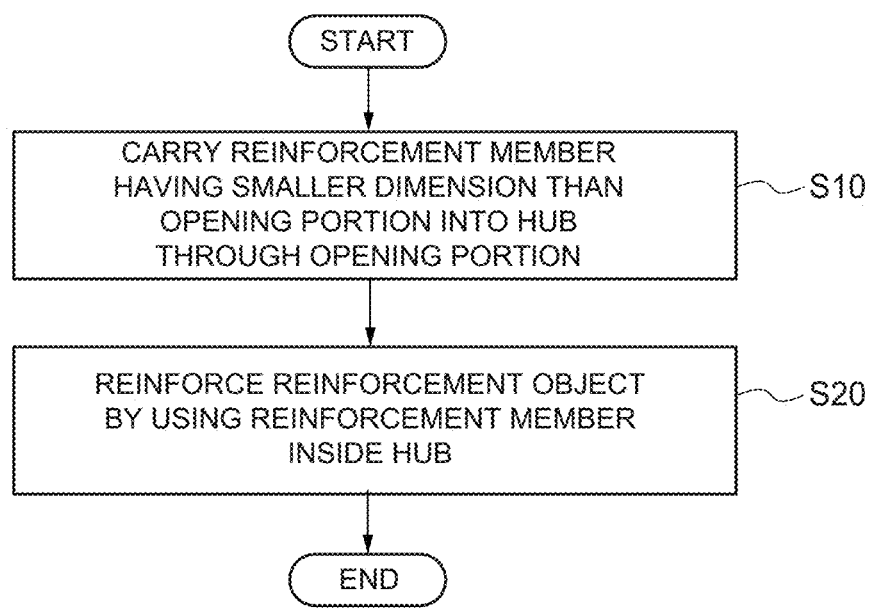
FIG. 4 is a flowchart illustrating a method of remodeling a wind turbine power generation facility according to one embodiment.

FIG. 1 is a schematic view illustrating a wind turbine power generation facility according to an embodiment, FIG. 2 is a perspective view illustrating an entire wind turbine blade according to one embodiment, FIG. 3 is a schematic view illustrating the configuration of a hub and its periphery according to one embodiment, and FIG. 4 is a flowchart illustrating a method of remodeling a wind turbine power generation facility according to an embodiment.

As illustrated in FIG. 1, a wind turbine power generation facility according to at least one embodiment of the disclosure (hereinafter, referred to as a wind turbine 1) includes: a plurality of (three in the example illustrated in FIG. 1) wind turbine blades 2; a rotor 4 including a hub 3 to which the wind turbine blades 2 are attached and a main shaft 5 coupled to the hub 3; a nacelle 7 that rotatably supports the rotor 4 via a main bearing (not illustrated); a tower 8 supporting the nacelle 7 yaw-rotatably; and a base 9 on which the tower 8 is installed. In the wind turbine 1, a generator 6 generates power with a rotational force of the rotor 4, received through a drive train 5A including the main shaft 5.

FIG. 2 illustrates a non-limiting example where a blade body 2C of each wind turbine blade 2 includes: a blade root portion 2A that has a substantially cylindrical shape and is attached to the hub 3 of the wind turbine 1; and a blade tip portion 2B that is farthest from the hub 3. The blade body 2C extends along a longitudinal direction (blade spanwise direction) between the blade root portion 2A and the blade tip portion 2B.

The hub 3 may be surrounded by a cover (head capsule) 30 covering the periphery of the hub 3 (see, for example, FIG. 3). In this configuration, a front portion of an inner space of the hub 3 communicates with an inner space of the cover 30 via an opening portion 3A and a back portion thereof communicates with an inner space of the nacelle 7, so that a worker can freely move through the nacelle 7, the hub 3, and the cover 30.

The cover 30 has a front portion provided with an opening portion 31 which may be configured to be openable and closable with an unillustrated door.

Figure 8A:
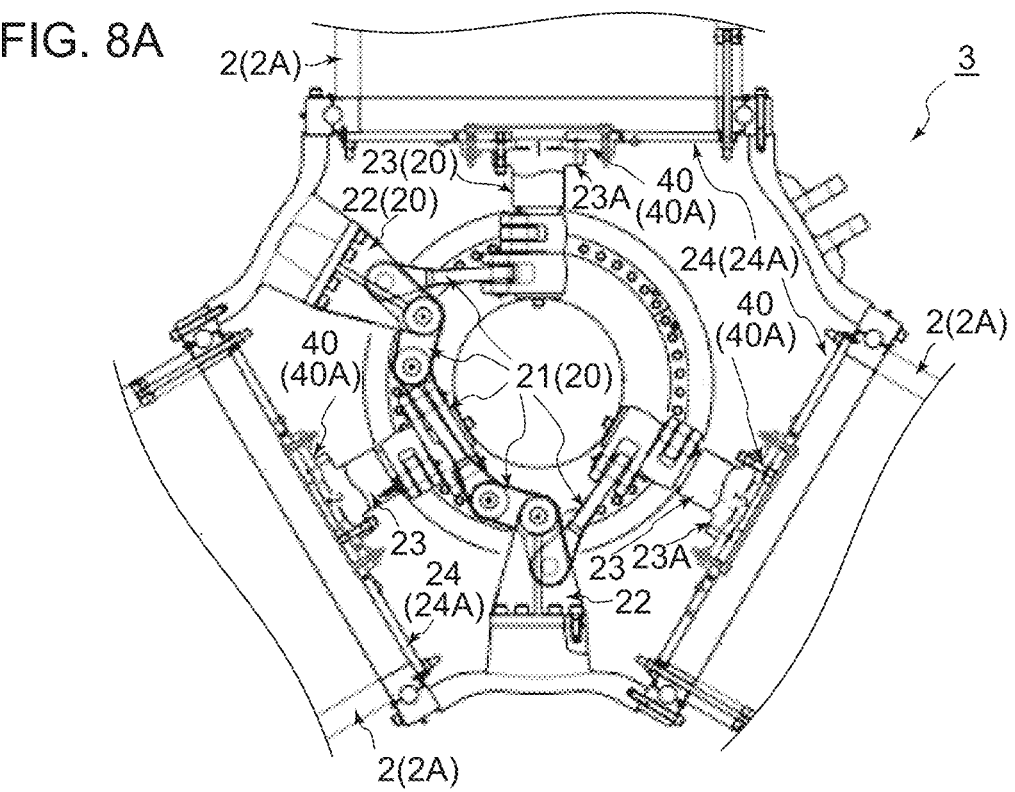
FIG. 8A and FIG. 8B are schematic views illustrating a method of remodeling a wind turbine power generation facility according to one embodiment.
Figure 8B:
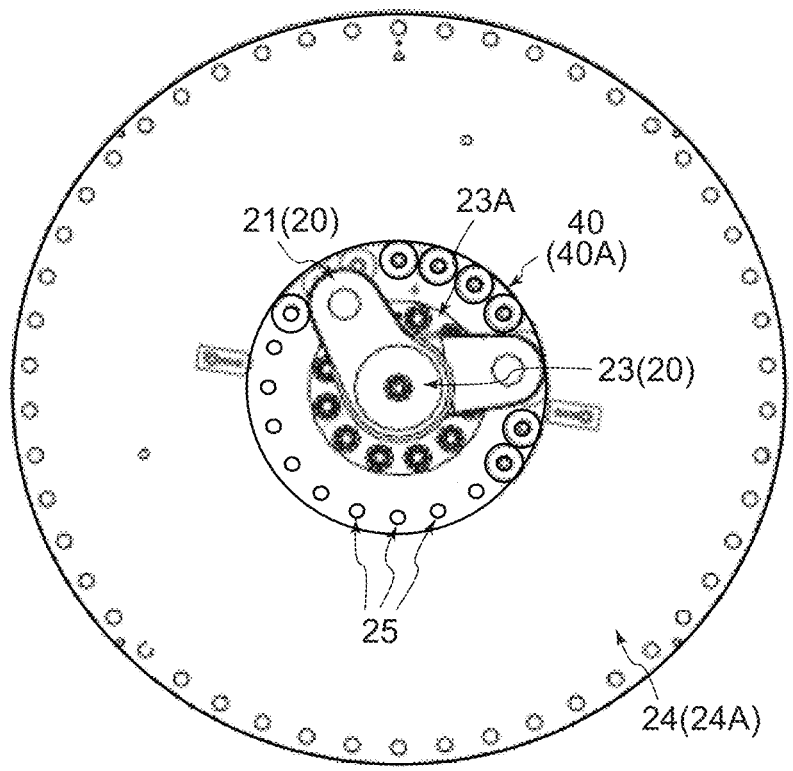

As illustrated by non-limited examples as in FIG. 3 and FIG. 4, a method of remodeling a wind turbine power generation facility according to at least one embodiment of the disclosure includes: a carry-in step (step S10) of carrying a reinforcement member 40 (see FIG. 6, FIG. 8A, and FIG. 8B) into the hub 3 through an opening portion 31 which has a smaller dimension than a reinforcement object 24 inside the wind turbine 1 and which brings into communication inside of the hub 3 and outside of a front side of the wind turbine 1, the reinforcement member 40 having a smaller dimension than the opening portion 31; and a reinforcement step (step S20) of processing the reinforcement object 24 inside the hub 3, and reinforcing the reinforcement object 24 by using the reinforcement member 40 carried into the hub 3.

In the carry-in step S10, the reinforcement member 40 may be carried inside from the outside of the cover 30 (that is, the outside of the wind turbine 1) through the opening portion 31 opened with the door open. The shape of the reinforcement member 40 is not particularly limited. The dimension of the reinforcement member 40 may be set to achieve a size small enough to pass through the opening portion 31. In some embodiments, the cover 30 itself may be openable and closable with respect to the hub 3. With this configuration, the reinforcement object 24 may be reinforced by using the reinforcement member 40 that can be carried in through the opening portion 3A in the front portion of the hub 3.

In the reinforcement step S20, the reinforcement object 24 is reinforced inside the hub 3, through a reinforcement (or repairing) operation by a worker using the reinforcement member 40 carried into the hub 3.

The reinforcement object 24 is not limited to a part installed in the hub 3, and may be a member provided inside the cover 30 to be accessible through the opening portion 31, inside the nacelle 7, or inside the tower 8 to be accessible from the inside of the nacelle 7 (for example, an upper portion of the tower 8), for example. Generally, the method of remodeling according to the disclosure can be applied to the reinforcement object 24 that is installed inside the wind turbine 1, has a larger dimension than the opening portion 31, and can be reinforced with a member having a smaller dimension than the opening portion 31.

With the above-described method, the reinforcement operation for the reinforcement object 24 can be completed with the processing operation performed inside the hub 3 using the reinforcement member 40 having the smaller dimension than the opening portion 31, that is, than the reinforcement object 24 and carried into the hub 3 through the opening portion 31 having a smaller dimension than the reinforcement object 24. Thus, the reinforcement or the remodeling for the wind turbine 1 does not require the reinforcement object 24, installed inside the wind turbine 1 and having a larger dimension than the opening portion 31 of the hub 3, to be carried out from the wind turbine 1. In other words, a simple method of performing the processing operation inside the hub 3 using the reinforcement member 40 that can be carried in through the opening portion 31 is employed, so that reinforcement by the large reinforcement object 24 can be implemented without being carried out from the wind turbine 1. Furthermore, reduction in a work load, and costs, as well as a period of reinforcement operation can be reduced significantly.

Figure 5:
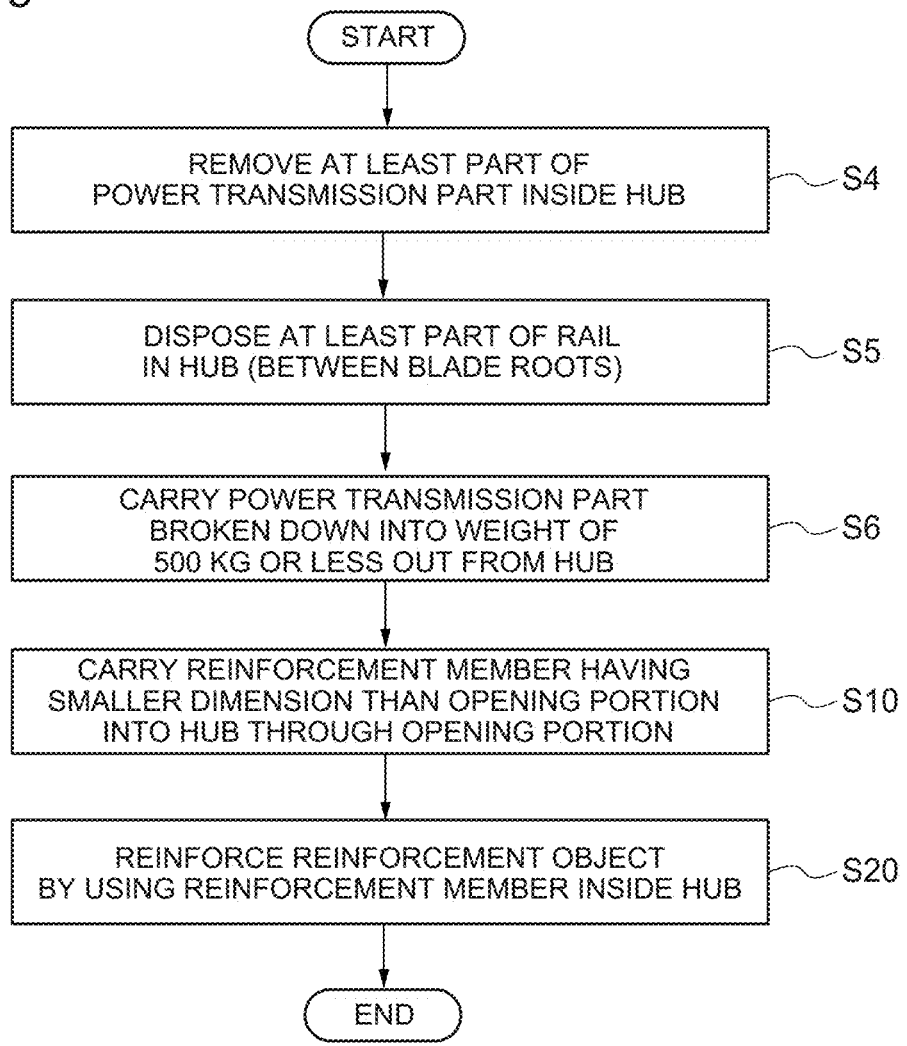
FIG. 5 is a flowchart illustrating a method of remodeling a wind turbine power generation facility according to another embodiment.
Figure 6:
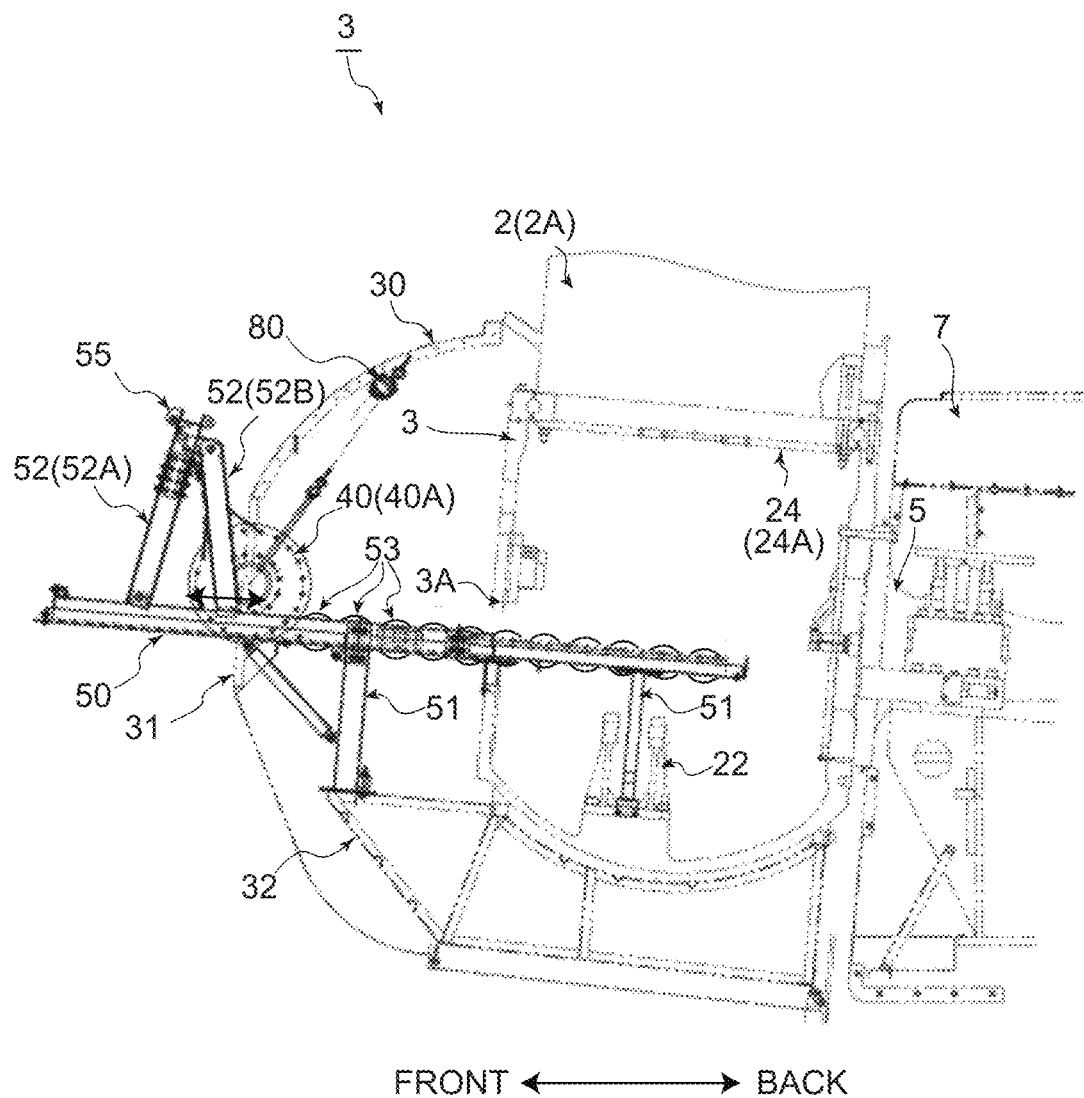
FIG. 6 is a schematic view illustrating a method of remodeling a wind turbine power generation facility according to one embodiment.

FIG. 5 is a flowchart illustrating a method of remodeling a wind turbine power generation facility according to another embodiment. FIG. 6 is a schematic view illustrating a method of remodeling a wind turbine power generation facility according to an embodiment.

As exemplarily illustrated in FIG. 3, FIG. 5, and FIG. 6 in a non-limiting manner, in some embodiments, the above-described method may further include an installment step (step S5) of installing a rail 50 and a pulley 55 supported on the rail 50 for lifting and lowering the reinforcement member 40, the rail 50 extending at least from the opening portion 31 to the inside of the hub 3, so that at least a part of the pulley 55 is disposed outside the opening portion 31 and at least a part of the rail 50 is disposed inside the hub 3. The carry-in step S10 may include carrying the reinforcement member 40 into the hub 3 by using the rail 50 and the pulley 55 (see FIG. 6).

The rail 50 may be provided to extend along a front and back direction inside the hub 3 (inside the hub 3 and the cover 30 if the cover 30 is provided). The rail 50 may have one end (front end) extending to protrude outside from the opening portion 31 of the cover 30 (or the opening portion 3A of the hub 3). At least one rail 50 is required, and thus a plurality of, e.g., two or more, rails 50 may be provided. With the configuration with a plurality of rails 50, the rails 50 may be arranged in parallel to one another.

The rail 50 may be horizontally arranged in the front and back direction, may be inclined downward from a front side to a back side, or, for example, may be arranged in parallel with an axial direction of the main shaft 5.

With the configuration with a plurality of rails 50, for example, a space for lifting and lowering the reinforcement member 40 (that is, an area with no components) may be at least partially provided between the rails 50.

The pulley 55 may have a strength high enough to withstand a load of the reinforcement member 40. For example, a wire 72 (or a rope) may be inserted through the pulley 55, and the reinforcement member 40 hanging from one end of the wire 72 may be carried into the hub 3 through the opening portion 31 with the wire 72 wound up or unwound (see, for example, FIG. 9A and FIG. 9B).

With the above-described method, the reinforcement member 40, having a smaller dimension than the opening portion 31, may be carried in and out through the opening portion 31, by being lifted and lowered by using the pulley 55 that is at least partially installed outside the opening portion 31. Thus, a work load can be largely reduced from a case where the pulley 55 is not used, and the carry-in and carry-out operations can be easily, quickly, and safely performed.

Figure 7:
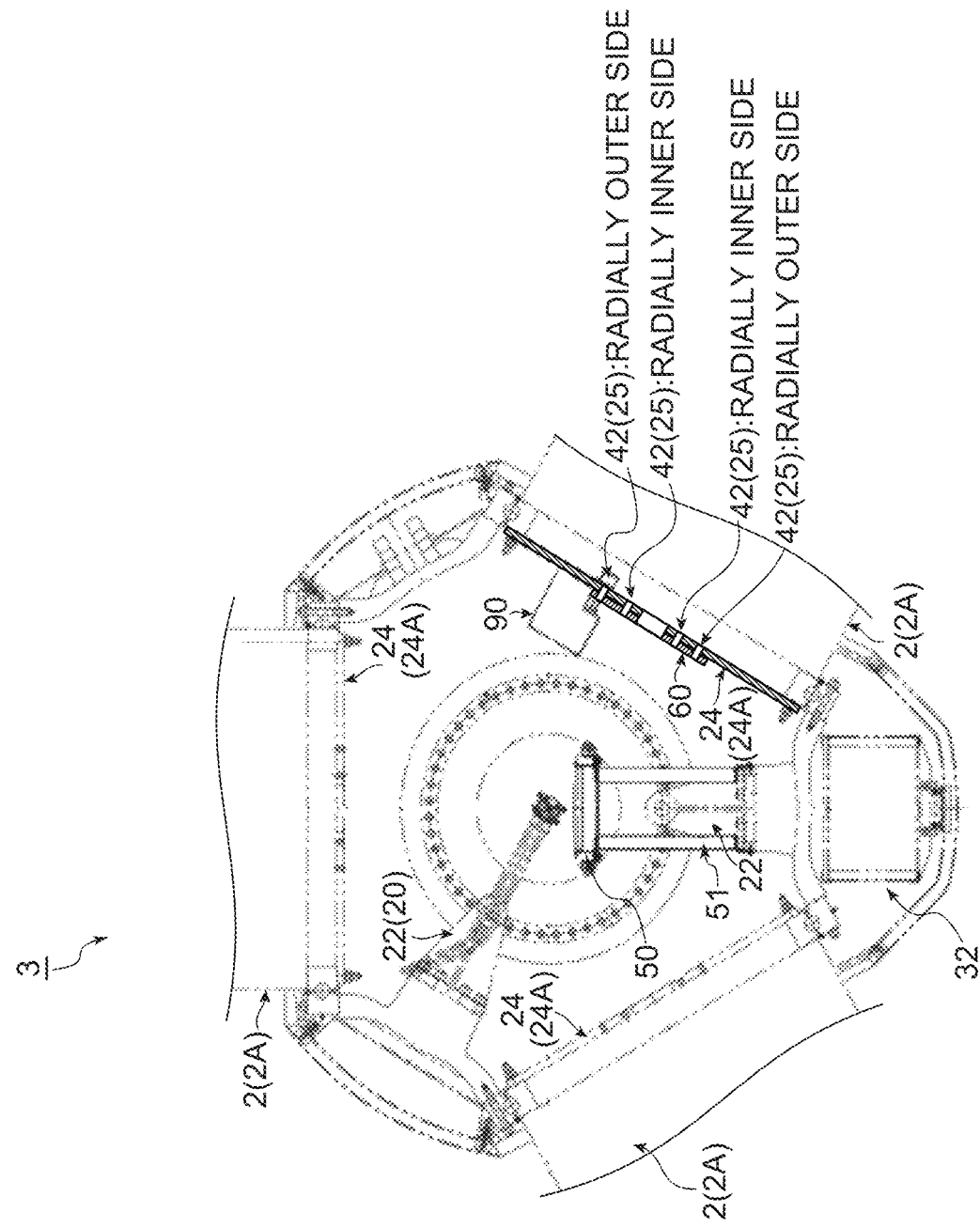
FIG. 7 is a schematic view illustrating a method of remodeling a wind turbine power generation facility according to one embodiment.

In some embodiments, the hub 3 may support a plurality of wind turbine blades 2, and the installment step S5 may include installing the rail 50 between blade root portions 2A of the wind turbine blades 2 inside the hub 3 (see FIG. 3, FIG. 6, and FIG. 7).

For example, the wind turbine 1 may include three wind turbine blades 2. With such a configuration, the rail 50 may be installed between the blade root portions 2A of the wind turbine blades 2 arranged at an interval of approximately 120° in front view of the wind turbine 1, inside the hub 3. A plurality of the rails 50 may be installed. With such a configuration, a normal line of a plane including each rail 50 may have an azimuth angle different from those of blade spanwise directions of two adjacent wind turbine blades 2 on either side of the rail 50 in front view of the wind turbine 1.

With the above-described method, the rail 50 is installed between the blade root portions 2A inside the hub 3. Thus, when an azimuth angle of the wind turbine blade 2 is set in such a manner that the rail 50 is positioned on the lower side in the hub 3 for carrying in the reinforcement member 40, no wind turbine blade 2 is arranged below the rail 50 and the pulley 55. Thus, the reinforcement member 40 can be carried in by using the rail 50 and the pulley 55, with no interference between the wind turbine blade 2 and the reinforcement member 40. This guarantees a field of view and improves operability for the carry-in operation.

In some embodiments, the method may further include a removing step (step S4) of removing at least a part of a power transmission part 20 (see FIG. 3, FIG. 7, FIG. 8A, and FIG. 8B) for causing pitch angles of the plurality of wind turbine blades 2 to be changed in conjunction. The installment step S5 may include installing a support member 51 for fixing at least a part of the rail 50 between the blade root portions 2A inside the hub 3, in place of the power transmission part 20 removed in the removing step (see FIG. 3 and FIG. 5 to FIG. 7).

The power transmission part 20 includes: a pitch actuator including a motor, a hydraulic cylinder, or the like; a link mechanism 21 that transmits a driving force from the pitch actuator; a bracket 22 serving as a support member with which the link mechanism 21 is supported in the hub 3; and a coupling shaft 23 for transmitting the driving force, received via the link mechanism 21, to the blade root portion 2A of the wind turbine blade 2.

The coupling shaft 23 may have a flange portion 23A on one end thereof to be fixed to a plate 24A that serves as a plate for attachment to the blade root portion 2A such that the coupling shaft 23 is concentric with respect to the plate 24A. In one embodiment, the coupling shaft 23 and the plate 24A may be fixed to one another via a fastening member (including a bolt for example).

The bracket 22 is provided between the blade root portion 2A of one of the wind turbine blades 2 and the blade root portion 2A of another one of the wind turbine blade 2 (see, for example, FIG. 8A), and may be fixed inside the hub 3 by a fastening member (including a bolt for example). In some embodiments, the bracket 22 may be removed, and a support member 51 for the rail 50 may be provided instead of the bracket 22.

The support member 51 that fixes the rail 50, supporting the pulley 55, inside the hub 3 receives a tensile force as well as a compressive force. Thus, the support member 51 is preferably firmly fixed inside the hub 3.

In view of this, according to the above-described method, the support member 51 that fixes at least a part of the rail 50 inside the hub 3 is provided in the hub 3, instead of the existing power transmission part 20 for linking the pitch angles of the wind turbine blades 2. Thus, no fixed portion or the like for fixing the support member 51 inside the hub 3 needs to be additionally provided inside the hub 3, and the existing structure that may contribute to the supporting of the rail 50 inside the hub 3 can be effectively used. This guarantees a work space inside the hub 3 to be as large as possible. Furthermore, a reinforcement or remodeling operation, requiring removing of the power transmission part 20, can be effectively performed with no waste in the work process.

In some embodiments, in the method according to any of the above-described embodiments, the pulley 55 may be supported on the rail 50 via a supporting mechanism 52 at least partially including a movable part which is movable along the rail 50 (see FIG. 3, FIG. 5, and FIG. 6). The installment step S5 may include installing the pulley 55 outside the opening portion 31 by moving at least a part of the supporting mechanism 52 along the rail 50 and fixing the movable part.

For example, the supporting mechanism 52 has a front-side support member 52A, provided on the front side, and a back-side support member 52B, provided on the back side, coupled to each other in such a manner as to be relatively pivotable with each other about an axis that is perpendicular to the front and back direction and extends along the horizontal direction. At least a back end portion of the back-side support member 52B is configured to be slidable in the front and back direction relative to the rail 50. A front end portion of the front-side support member 52A and the back end portion of the back-side support member 52B are fixed to the rail 50 (by a stopper or the like (not shown) for example) in a state where the front-side support member 52A and the back-side support member 52B are provided to form an elbow shape. Thus, the pulley 55 can be installed outside the opening portion 31.

Alternatively, a configuration in which the front-side support member 52A and the back-side support member 52B can both slide in the front and back direction relative to the rail 50 may be employed. Also in this configuration, the interference between the supporting mechanism 52 and the opening portion 31 can be avoided in a process of installing or accommodating the supporting mechanism 52.

With the above-described method, the configuration for installing the pulley 55 outside the opening portion 31 can be achieved with a simple configuration using the supporting mechanism 52. Specifically, a configuration that enables the pulley 55 to be installed outside the opening portion 31 and can withstand the load of the reinforcement member 40 can be achieved smoothly with at least a part of the supporting mechanism 52, in a state of being in a size small enough to pass through the opening portion 31, moved along the rail 50, and at least a part of the supporting mechanism 52 fixed to the rail 50 after the pulley 55 is installed outside the opening portion 31.

In some embodiments, in the method according to any of the above-described embodiments, the carry-in step S10 includes lifting and lowering the reinforcement member 40 by using a winch 70 connected to the wire 72 inserted through the pulley 55 (for example, see FIG. 9A and FIG. 9B).

With the above-described method, a driving force for lifting and lowering the reinforcement member 40 that can pass through the opening portion 31 of the hub 3 can be obtained from the winch 70 via the wire 72 inserted through the pulley 55. Thus, a work load on an operator can be largely reduced in the lifting and lowering operation for carrying in and out the reinforcement member 40, used for reinforcing or remodeling the wind turbine 1. Furthermore, since a large crane will not be required, a space and costs for installing the same will be saved significantly.

In some embodiments, in the above-described method, the wind turbine 1 may include a nacelle 7 rotatably supporting a rotor 4 which includes the wind turbine blades 2 and the hub 3, and a tower 8 supporting the nacelle 7 yaw-rotatably. The carry-in step S10 may include lifting and lowering the reinforcement member 40 by using the winch 70 installed on a lower part of the tower 8 or an upper part of the nacelle 7 (see FIG. 9A and FIG. 9B). For example, FIG. 9A illustrates a state where the winch 70 is installed on a lower portion of the tower 8. FIG. 9B illustrates a state where the winch 70 is installed on an upper portion of the nacelle 7.

With the above-described method, the winch 70 can be installed at a position separated from the pulley 55 that is at least partially installed outside the opening portion 31 of the hub 3. With this arrangement, a large work space can be guaranteed around the opening portion 31. Furthermore, the winch 70 can be provided at a location to be capable of withstanding the counterforce acting on the winch 70 while the reinforcement member 40 is being lifted and lowered.

In some embodiments, in the method according to any of the above-described embodiments, the rail 50 may include a plurality of rollers 53 arranged in parallel to one another along a horizontal direction which is perpendicular to a longitudinal direction of the rail 50. The carry-in step S10 may include placing the reinforcement member 40 on the rollers 53 and carrying the reinforcement member 40 through the opening portion 31 (see FIG. 6).

With the above-described method, the reinforcement member 40 is placed on the plurality of rollers 53 provided on the rail 50 to be moved by these plurality of rollers 53. Thus, the reinforcement member 40 can easily move between the opening portion 31 and an inner space of the hub 3.

In some embodiments, in the method according to any of the above-described embodiments, the reinforcement object 24 may include a plate 24A connected to the blade root portion 2A of each of the wind turbine blades 2 inside the hub 3, and the reinforcement member 40 may include a reinforcement plate 40A having an annular shape disposed between the plate 24A and a coupling shaft 23 for transmitting torque for changing a pitch angle to the plate 24A, the reinforcement plate having a larger diameter than a flange portion 23A of the coupling shaft 23 fastened to the plate 24A and a smaller diameter than the plate 24A.

For example, the plate 24A may be formed to be in a form of a circular plate with substantially the same diameter as the blade root portion 2A.

The reinforcement step S20 may include forming bolt holes 25 for attaching the reinforcement plate 40A on the plate 24A by using a template 60 having a plurality of through holes 42 which indicate bolt positions for attaching the reinforcement plate 40A to the plate 24A (for example, see FIG. 7).

With the above-described method, the template 60 is used, so that the bolt holes 25, for attaching the reinforcement plate 40A to the plate 24A, can be easily formed in the plate 24A. Furthermore, the bolt holes 25 can be formed at accurate positions with respect to the plate 24A, and a work time can be largely reduced.

In some embodiments, in the above-described method, the template 60 may include radially inner side through holes 42 corresponding to existing bolt holes 25 for inserting a bolt to fasten the coupling shaft 23 and the plate 24A; and radially outer side through holes 42 for attaching the reinforcement plate 40A to the plate 24A (see FIG. 7).

With the above-described method, the template 60 is attached to the plate 24A via the radially inner side through holes 42 corresponding to the existing bolt holes 25 for fastening the coupling shaft 23 and the plate 24A. In this state, the bolt holes 25 can be formed in the plate 24A through the radially outer side through holes 42. Thus, a new bolt hole 25 can be formed at an accurate position after the existing bolt hole 25 has been formed. Moreover, the operation for forming the bolt holes 25 can be easily performed in a shorter period of time.

In some embodiments, in the above-described method, the reinforcement step S20 may include forming the bolt holes 25 on the plate 24A by using a magnetic drilling machine 90 which is magnetically attachable to the plate 24A inside the hub 3 (see FIG. 7).

With the above-described method, the magnetic drilling machine 90 is used, so that the operation for forming the bolt holes 25 can be easily performed. Furthermore, the magnetic drilling machine 90 is magnetically attachable to the plate 24A, and thus can be easily positioned with respect to the plate 24A. Thus, the reinforcement operation inside the hub 3 can be completed within a much shorter period of time.

In some embodiments, the method according to any of the above-described embodiments may further include a carry-out step S6 of carrying the power transmission part 20 broken down inside the hub 3 out from the hub 3 by using the rail 50 and the pulley 55 (see FIG. 5).

With the above-described method, the power transmission part 20 broken down inside the hub 3 is carried out from the hub 3. This guarantees a large work space inside the hub 3 for performing the reinforcement operation for the reinforcement object 24 inside the hub 3. Thus, a higher operability can be achieved.

In some embodiments, in the above-described method, the carry-out step S6 may include carrying out the power transmission part 20 broken down into a weight of 500 kg or less.

With the above-described method, the power transmission part 20 may be broken down into a weight of 500 kg or less to be carried out through the opening portion 31 of the hub 3. This means that most of the parts required to be carried in and out for reinforcing or remodeling the wind turbine 1 can be carried in and out through the opening portion 31. Thus, for example, even the power transmission part 20 can be carried out without requiring a large crane, and the pulley 55 and the winch 70 can be used for carrying in and out the parts through the opening portion 31. Thus, a space and a cost used for installing the crane are not required, whereby a large reduction in space and cost can be achieved.

In some embodiments, in the method according to any of the above-described embodiments, the carry-in step S10 or the reinforcement step S20 includes using at least one chain block 80 disposed inside the hub 3, in order to support the reinforcement member 40, change a direction of the reinforcement member 40, or move the reinforcement member 40 (see FIG. 6).

With the above-described method, the chain block 80 disposed inside the hub 3 is used to support the reinforcement member 40, change a direction of the reinforcement member 40, or move the reinforcement member 40 inside the hub 3. Thus, the work load on the worker can by further reduced, and the work can be guaranteed to be performed more safely and quickly.

A reinforcement operation for the reinforcement object 24 performed with a method of remodeling a wind turbine power generation facility according to one embodiment of the disclosure is described based on the content of the disclosure described above.

First of all, the power transmission part 20 inside the hub 3 is broken down, and at least one bracket 22 is carried out. In another embodiment, the bracket 22 may not be carried out, and may be used for fixing the support member 51.

Then, the rail 50 is installed as a crane-less replacement jig, inside the hub 3 (and inside the cover 30). In this process, the support member 51 that supports at least a part of the rail 50, that is, the back end portion side of the rail 50 is installed inside the hub 3 from which the support member 51 has been removed. The support member 51 that supports a front end portion side of the rail 50 may be fixed on a platform 32 disposed on the front portion side inside the hub 3 or the cover 30 for example. The platform 32 may be installed between one of the blade root portion 2A and another one of the blade root portions 2A, may be installed at a position suitable for the operation to be performed, or may be constantly installed. In this state, the front-side support member 52A and the back-side support member 52B of the supporting mechanism 52 may be moved toward the front side, and the supporting mechanism 52 may be fixed in a state in which the pulley 55 is disposed on the outer side of the opening portion 31. Alternatively, the supporting mechanism 52 may be disposed in accordance with and after the timing at which the reinforcement member 40 is carried in.

Next, the pitch actuator, the link mechanism 21, and the coupling shaft 23, which are components of the power transmission part 20, are removed inside the hub 3, so that the plate 24A that is the reinforcement object 24 is exposed.

Next, the template 60 is concentrically attached to the plate 24A (for example, the template 60 may be attached with the existing bolt holes 25 on the side of the plate 24A matched with the radially inner side bolt holes of the template 60). Then, a bolt position is marked on the plate 24A by punching through the radially outer side bolt holes 25 of the template 60.

Then, the bolt holes 25 for attaching the reinforcement plate 40A, serving as the reinforcement member 40, are formed in the plate 24A. For example, the magnetic drilling machine 90 may be used for forming the bolt holes 25.

Next, the reinforcement plate 40A is carried into the hub 3 through the opening portion 31. In this process, the reinforcement plate 40A is carried in by using the wire 72 passing through the pulley 55, with the winch 70 disposed on the lower portion of the tower 8 of the wind turbine 1, or on the upper portion of the nacelle 7 as a driving source. For example, the chain block 80, disposed on the upper portion in the cover 30, is used to attach a sling to the reinforcement plate 40A lifted above through a portion between the two rails 50. As the chain block 80 is in a wound operation, the reinforcement plate 40A moves toward the back side to be placed on the rollers 53 of the rails 50. In this process, the plurality of chain blocks 80 may be used to lay the reinforcement plate 40A down onto the rollers 53. The reinforcement plate 40A placed on the rollers 53 is moved toward the back end side of the rollers 53 by using the plurality of chain blocks 80 or the like to be carried into the hub 3.

Then, the chain block 80 provided inside the hub 3 is used to lift up the reinforcement plate 40A and to make the reinforcement plate 40A arranged at a center portion of the plate 24A that is the reinforcement object while being concentric with respect to the plate 24A. Then, the bolt holes 25 are positioned, and bolts are inserted through the radially outer side through holes 42 and then are fastened. Thus, the reinforcement plate 40A is positioned.

Thus, the power transmission part 20 including the coupling shaft 23, the link mechanism 21, the pitch actuator, and the like is attached after the reinforcement plate 40A has been attached to all the plates 24A that need to be reinforced.

During the entire operation, a member that needs to be carried in or out through the opening portion 31 is carried out as appropriate by using the rail 50, the pulley 55, the winch 70, or the like.

As described above, according to some embodiments of the disclosure, a large reinforcement object 24 can be reinforced without being carried out from the wind turbine 1.

While some embodiments of the disclosure have been described, it should be noted that the disclosure is not limited to the embodiments described above and also includes embodiments with modifications to the embodiments described above and a combination of these embodiments.

The invention claimed is:

1. A method of remodeling a wind turbine power generation facility, comprising:

a carry-in step of carrying a reinforcement member into a hub through an opening portion which has a smaller dimension than a reinforcement object inside the wind turbine power generation facility, the opening portion bringing into communication inside of the hub and outside of a front side of the wind turbine power generation facility, the reinforcement member having a smaller dimension than the opening portion;

a reinforcement step of processing the reinforcement object inside the hub, and reinforcing the reinforcement object by using the reinforcement member carried into the hub; and a fixing step of magnetically fixing a magnetic drilling machine on a plate disposed inside the hub so as to be connected to a blade root of each of a plurality of wind turbine blades, wherein the reinforcement step comprises forming in the plate as the reinforcement object bolt holes for attaching the reinforcement member to the reinforcement object, formation of the bolt holes being performed inside the hub by using the magnetic drilling machine.

2. The method of remodeling a wind turbine power generation facility according to claim 1, further comprising an installment step of installing a rail and a pulley supported on the rail for lifting and lowering the reinforcement member, the rail extending at least from the opening portion to the inside of the hub, so that at least a part of the pulley is disposed outside the opening portion and at least a part of the rail is disposed inside the hub, wherein the carry-in step includes carrying the reinforcement member into the hub by using the rail and the pulley.

3. The method of remodeling a wind turbine power generation facility according to claim 2, wherein the hub supports a plurality of wind turbine blades, and wherein the installment step includes installing the rail between blade roots of the wind turbine blades inside the hub.

4. The method of remodeling a wind turbine power generation facility according to claim 2, wherein the pulley is supported on the rail via a supporting mechanism at least partially including a movable part which is movable along the rail, and wherein the installment step includes installing the pulley outside the opening portion by moving the movable part of the supporting mechanism along the rail and fixing the movable part.

5. The method of remodeling a wind turbine power generation facility according to claim 2, wherein the carry-in step includes lifting and lowering the reinforcement member by using a winch connected to a wire inserted through the pulley.

6. The method of remodeling a wind turbine power generation facility according to claim 5, wherein the wind turbine power generation facility includes a nacelle rotatably supporting a rotor which includes the wind turbine blades and the hub, and a tower supporting the nacelle yaw-rotatably, and wherein the carry-in step includes lifting and lowering the reinforcement member by using the winch installed on a lower part of the tower or an upper part of the nacelle.

7. The method of remodeling a wind turbine power generation facility according to claim 1, wherein the carry-in step or the reinforcement step includes using at least one chain block disposed inside the hub, in order to support the reinforcement member, change a direction of the reinforcement member, or move the reinforcement member.

8. A method of remodeling a wind turbine power generation facility, comprising:
a carry-in step of carrying a reinforcement member into a hub through an opening portion which has a smaller dimension than a reinforcement object inside the wind turbine power generation facility, the opening portion bringing into communication inside of the hub and outside of a front side of the wind turbine power generation facility, the reinforcement member having a smaller dimension than the opening portion;
a reinforcement step of processing the reinforcement object inside the hub, and reinforcing the reinforcement object by using the reinforcement member carried into the hub; and
an installment step of installing a rail and a pulley supported on the rail for lifting and lowering the reinforcement member, the rail extending at least from the opening portion to the inside of the hub, so that at least a part of the pulley is disposed outside the opening portion and at least a part of the rail is disposed inside the hub,
wherein the carry-in step includes carrying the reinforcement member into the hub by using the rail and the pulley,
wherein the method further comprises a removing step of removing at least a part of a power transmission part for causing pitch angles of the plurality of wind turbine blades to be changed in conjunction, and
wherein the installment step includes installing a support member for fixing at least a part of the rail between the blade roots inside the hub, in place of the power transmission part removed in the removing step.

9. The method of remodeling a wind turbine power generation facility according to claim 8,
further comprising a carry-out step of carrying the power transmission part broken down inside the hub out from the hub by using the rail and the pulley.

10. The method of remodeling a wind turbine power generation facility according to claim 9,
wherein the carry-out step includes carrying out the power transmission part broken down into a weight of 500 kg or less.

11. A method of remodeling a wind turbine power generation facility comprising:
a carry-in step of carrying a reinforcement member into a hub through an opening portion which has a smaller dimension than a reinforcement object inside the wind turbine power generation facility, the opening portion bringing into communication inside of the hub and outside of a front side of the wind turbine power generation facility, the reinforcement member having a smaller dimension than the opening portion;
a reinforcement step of processing the reinforcement object inside the hub, and reinforcing the reinforcement object by using the reinforcement member carried into the hub; and
an installment step of installing a rail and a pulley supported on the rail for lifting and lowering the reinforcement member, the rail extending at least from the opening portion to the inside of the hub, so that at least a part of the pulley is disposed outside the opening portion and at least a part of the rail is disposed inside the hub,
wherein the carry-in step includes carrying the reinforcement member into the hub by using the rail and the pulley,
wherein the rail includes a plurality of rollers arranged inside the hub in parallel to one another along a horizontal direction which is perpendicular to a longitudinal direction of the rail, and
wherein the carry-in step includes placing the reinforcement member on the rollers and moving the reinforcement member along a roller conveyance path formed by the plurality of rollers through the opening portion.

12. The method of remodeling a wind turbine power generation facility according to claim 1,
wherein the reinforcement member includes a reinforcement plate having an annular shape disposed between the plate and a coupling shaft for transmitting a torque for changing a pitch angle to the plate, the reinforcement plate having a larger diameter than a flange portion of the coupling shaft fastened to the plate and a smaller diameter than the plate, and
wherein the reinforcement step includes forming the bolt hole for attaching the reinforcement plate on the plate by using a template having a plurality of through holes which indicate bolt positions for attaching the reinforcement plate to the plate.

13. The method of remodeling a wind turbine power generation facility according to claim 12,
wherein the template includes:
a radially inner side through hole corresponding to an existing bolt hole for inserting a bolt to fasten the coupling shaft and the plate; and
a radially outer side through hole for attaching the reinforcement plate to the plate.

* * * * *